(12) United States Patent
Hogge et al.

(10) Patent No.: US 12,472,404 B2
(45) Date of Patent: *Nov. 18, 2025

(54) GOLF BALL HAVING A RADAR DETECTABLE MARK

(71) Applicant: Acushnet Company, Fairhaven, MA (US)

(72) Inventors: Matthew F. Hogge, Plymouth, MA (US); Brian Comeau, Berkley, MA (US); Michael R. Madson, Easton, MA (US); Richard Daprato, Acushnet, MA (US); Nicholas M. Nardacci, Barrington, RI (US); Peter L. Serdahl, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,922

(22) Filed: Nov. 1, 2021

(65) Prior Publication Data

US 2022/0161103 A1     May 26, 2022

Related U.S. Application Data

(60) Provisional application No. 63/212,225, filed on Jun. 18, 2021, provisional application No. 63/116,803, filed on Nov. 20, 2020, provisional application No. 63/116,535, filed on Nov. 20, 2020.

(51) Int. Cl.
*A63B 37/06* (2006.01)
*A63B 37/00* (2006.01)

(52) U.S. Cl.
CPC .... *A63B 37/00221* (2020.08); *A63B 37/0039* (2013.01); *A63B 37/0076* (2013.01); *A63B 37/0073* (2013.01); *A63B 37/0074* (2013.01); *A63B 37/0075* (2013.01)

(58) Field of Classification Search
CPC ................. A63B 37/0038; A63B 37/0022
USPC ........................................ 473/378, 373
See application file for complete search history.

(56) References Cited

U.S. PATENT DOCUMENTS

| | | | |
|---|---|---|---|
| 4,284,276 A | 8/1981 | Worst | |
| 4,660,039 A | 4/1987 | Barricks et al. | |
| 5,564,707 A | 10/1996 | Dinh | |
| 6,217,463 B1 | 4/2001 | Maruko et al. | |
| 6,244,971 B1 | 6/2001 | Mihran | |
| 6,422,949 B1 | 7/2002 | Byrne | |
| 7,364,515 B2 | 4/2008 | Kasashima | |
| 9,795,832 B2 | 10/2017 | Saegusa | |
| 10,611,181 B1 | 4/2020 | Moylan | |
| 10,918,915 B1 | 2/2021 | Moylan | |
| 12,161,916 B1 | 12/2024 | Simonds | |
| 2002/0086741 A1 | 7/2002 | Newcomb | |
| 2003/0022724 A1 | 1/2003 | Rennecamp | |
| 2003/0109319 A1 | 6/2003 | Andresen | |
| 2005/0070375 A1* | 3/2005 | Savarese | A63B 43/00 473/353 |

(Continued)

FOREIGN PATENT DOCUMENTS

| | | |
|---|---|---|
| CN | 104083855 | 10/2014 |
| JP | 2020-081349 A | 6/2020 |

*Primary Examiner* — Raeann Gorden
(74) *Attorney, Agent, or Firm* — Thomas P. Gushue

(57) ABSTRACT

Golf balls including one or more layers having at least one radar detectable mark disposed on the surface thereof are provided.

15 Claims, 12 Drawing Sheets

TOP VIEW

FRONT VIEW

SIDE VIEW

REAR VIEW

(56) References Cited

U.S. PATENT DOCUMENTS

| | | | |
|---|---|---|---|
| 2006/0122007 A1* | 6/2006 | Savarese | G06K 19/07758 473/351 |
| 2007/0072700 A1 | 3/2007 | Chute | |
| 2007/0105637 A1 | 5/2007 | Shimizu | |
| 2007/0207874 A1 | 9/2007 | Klein | |
| 2008/0021651 A1 | 1/2008 | Seeley | |
| 2008/0182090 A1* | 7/2008 | Rouse | C09D 11/52 252/514 |
| 2010/0293777 A1 | 11/2010 | Savarese et al. | |
| 2011/0207553 A1 | 8/2011 | Reid et al. | |
| 2012/0058844 A1 | 3/2012 | Huang | |
| 2013/0324310 A1 | 12/2013 | Leech et al. | |
| 2014/0018194 A1* | 1/2014 | Wachi | A63B 37/0023 473/378 |
| 2015/0020377 A1 | 1/2015 | Savarese et al. | |
| 2015/0087443 A1 | 3/2015 | Kitazaki et al. | |
| 2018/0036603 A1 | 2/2018 | Saegusa et al. | |
| 2021/0008417 A1* | 1/2021 | Tuxen | A63B 37/0022 |
| 2022/0161102 A1 | 5/2022 | Hogge | |
| 2022/0161104 A1 | 5/2022 | Hogge | |

\* cited by examiner

GOLF BALL HAVING A RADAR DETECTABLE MARK

CROSS-REFERENCE TO RELATED APPLICATIONS

The present application claims the benefit of U.S. Provisional Application No. 63/116,535, filed Nov. 20, 2020; U.S. Provisional Application No. 63/116,803, filed Nov. 20, 2020; and U.S. Provisional Application No. 63/212,225, filed Jun. 18, 2021; the entire disclosures of which are hereby incorporated herein by reference.

FIELD OF THE INVENTION

The present invention relates generally to golf balls including a mark, or a plurality of marks, for improving the detection and tracking thereof by radar systems. Such golf balls are particularly useful in providing launch condition data in limited distance environments, such as indoor golf ball hitting bays.

BACKGROUND OF THE INVENTION

Interest continues to increase in golf experiences which require a system for detecting golf ball launch conditions, such as golf simulators and golf equipment fitting. Radar tracking systems that are currently used for this purpose are limited, however, in their ability to accurately obtain launch condition data, for example, ball spin properties, in environments, and particularly indoor environments, where the ball travels a limited distance.

There are also disadvantages to the use of the radar reflective stickers that are commonly used with radar tracking systems. Radar reflective stickers are typically placed on the outer surface of the golf ball in order for radar tracking systems to obtain launch condition data. However, there are challenges associated with the use of these stickers, including, for example, accurate positioning of the stickers on the ball, alignment of the stickers relative to the golfer and tee, time and effort required to place the stickers on the ball, and lack of durability of the stickers, which further leads to a decrease in the quality of launch condition data and the need to replace the stickers.

Thus, there is a need for a golf ball that provides one or more of the following benefits: improved quality of golf ball launch condition data collected by radar tracking systems, especially in limited travel distance environments, and enhanced experience for the end users of these radar tracking systems.

SUMMARY OF THE INVENTION

The present invention is directed to a golf ball comprising at least one layer with a mark, or a plurality of marks, disposed on a surface thereof.

In a particular embodiment, the mark has a continuous shape and is formed from a radar detectable material. In a particular aspect of this embodiment, the golf ball additionally has one or more of the following properties:
 a) the mark has a non-circular shape;
 b) the radar detectable material is an electrically conductive ink comprising a base resin and an electrically conductive material, wherein the base resin is optionally selected from the group consisting of vinyl polymers, urethane polymers, acrylic polymers, epoxy polymers, and combinations of two or more thereof, and wherein the electrically conductive material is optionally selected from the group consisting of silver, electrically conductive carbon, aluminum, graphene, nanotubes, nanometals, and combinations of two or more thereof;
 b) the mark has a resistivity of from 0.1 Ohms to 2,500 Ohms;
 c) the mark has dimensions such that every 0.025 inch wide great circle path on the golf ball layer surface on which the mark is disposed intersects the mark; and
 d) the golf ball comprises an inner core layer, an outer cover layer, and one or more intermediate layers disposed between the inner core layer and the outer cover layer; and the surface on which the mark is disposed is the outer surface of the intermediate layer positioned adjacent to the outer cover layer.

In another particular embodiment, the mark is formed from a radar detectable material and has dimensions such that every great circle path on the golf ball layer surface on which the mark is disposed intersects the mark.

In another particular embodiment, the mark is formed from a radar detectable material and has a continuous shape comprising three or more intersecting stripes.

In another particular embodiment, the at least one layer has a plurality of radar detectable marks disposed on a surface thereof. In a particular aspect of this embodiment, the radar detectable marks have a resistivity of from 0.1 Ohms to 25 Ohms. In another particular aspect of this embodiment, every 0.025 inch wide great circle path on the golf ball layer surface on which the radar detectable marks are disposed intersects at least one of the marks. In another particular aspect of this embodiment, every great circle path on the golf ball layer surface on which the radar detectable marks are disposed intersects at least one of the marks. In another particular aspect of this embodiment, the plurality of radar detectable marks includes a first mark and a second mark, wherein the first mark has a continuous, irregular shape and the second mark has a basic shape selected from basic nonpolygonal shapes, regular polygons, and irregular polygons. Non-limiting examples of suitable basic nonpolygonal shapes include circles, rings, and crescents. Non-limiting examples of suitable regular polygons include squares and equilateral triangles. Non-limiting examples of suitable irregular polygons include rectangles, non-equilateral triangles, and chevrons. In another particular aspect of this embodiment, the plurality of radar detectable marks includes a first mark and a second mark, wherein the first mark has a continuous, irregular shape comprising a plurality of intersecting stripes, and the second mark has an irregular shape that is different from the first mark. In another particular aspect of this embodiment, the plurality of radar detectable marks includes a third mark, the third mark having either an irregular shape or a regular shape. In another particular aspect of this embodiment, when all of the radar detectable marks present on any layer of the ball are radially projected onto the outer surface of the ball, the radar detectable marks have a total surface coverage of from 1% to 20%.

In another particular embodiment, the golf ball comprises two or more layers, wherein at least two of the two or more layers have one or more radar detectable marks disposed on a surface thereof. When all of the radar detectable marks present on any layer of the ball are radially projected onto the outer surface of the ball, every 0.025 inch wide great circle path on the golf ball outer surface intersects at least one of the marks.

BRIEF DESCRIPTION OF THE DRAWINGS

In the accompanying drawings, which form a part of the specification and are to be read in conjunction therewith, and in which like reference numerals are used to indicate like parts in the various views.

DETAILED DESCRIPTION

Figure 1:
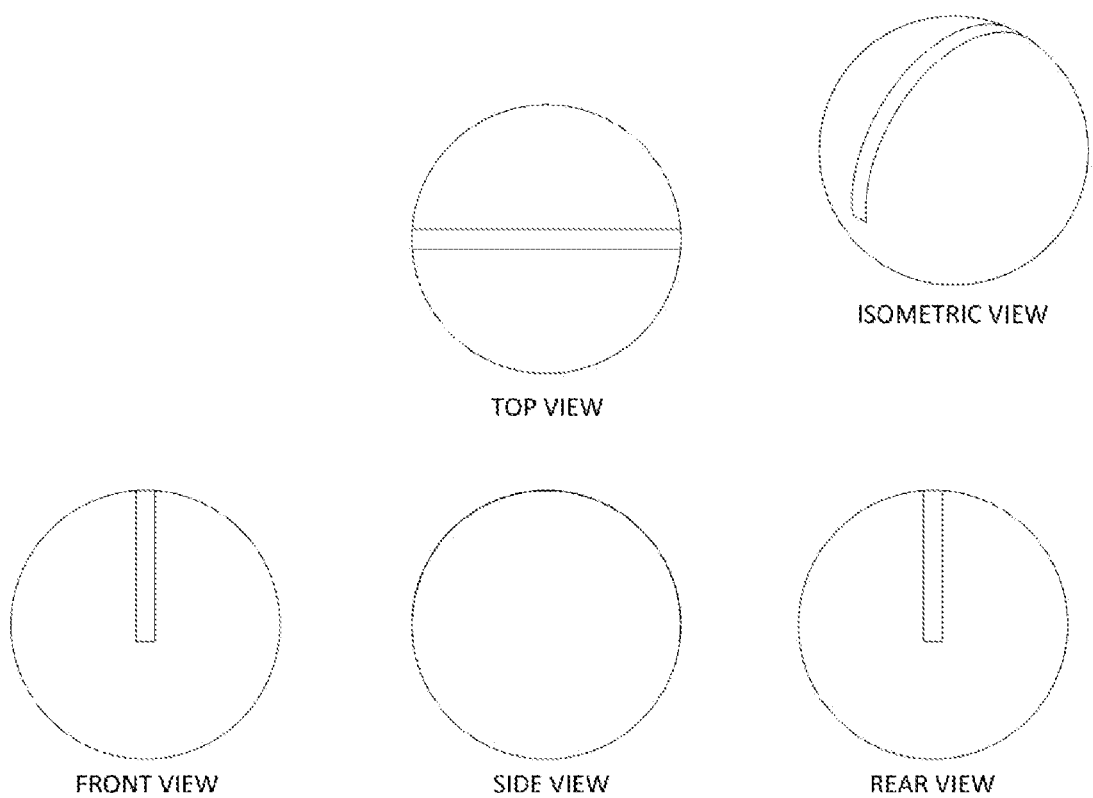
FIG. 1 illustrates a top view, an isometric view, a front view, a side view, and a rear view of a mark, according to an embodiment of the present invention.

Golf balls of the present invention include one or more layers which have at least one radar detectable mark disposed on a surface thereof. Particularly suitable radar detectable materials for forming the mark include, but are not limited to, electrically conductive inks comprising a base resin and an electrically conductive material. The ink may be water-borne or solvent-borne. The ink may be a 1-component or 2-component ink. The ink may be cured with an isocyanate-based curing agent, UV cure, and/or thermal cure. The ink and the mark formed therefrom may be transparent or opaque. In a particular embodiment, the base resin of the ink is selected from the group consisting of vinyl polymers, urethane polymers, acrylic polymers, epoxy polymers, and combinations of two or more thereof. In another particular embodiment, the electrically conductive material of the ink is selected from the group consisting of silver, conductive carbon, aluminum, graphene, nanotubes, nanometals, and combinations of two or more thereof. Particularly suitable inks are those capable of producing a mark having a resistivity of 0.1 Ohms or 0.5 Ohms or 1 Ohm or 5 Ohms or 6 Ohms or 7 Ohms or 25 Ohms or 2,500 Ohms, or a resistivity within a range having a lower limit and an upper limit selected from these values. Non-limiting examples of suitable commercially available inks are Ink Lab 303 silver conductive ink, commercially available from ITW Trans Tech; silver inks, conductive carbon inks, aluminum inks, silver/carbon blend inks, and aluminum/carbon blend inks, commercially available from Creative Materials Inc. In embodiments of the present invention wherein the golf ball includes more than one radar detectable mark on a single layer, the radar detectable material used to form one mark may be the same as or different from the radar detectable material used to form another mark. In embodiments of the present invention wherein the golf ball includes at least two layers having one or more radar detectable marks disposed on a surface thereof, the radar detectable material used to form a mark on one layer may be the same as or different from the radar detectable material used to form a mark on another layer.

Radar detectable material is applied to the surface of a layer using any suitable technique. In a particular embodiment, a mark is formed by applying radar detectable material to a surface of a golf ball layer by pad printing. In a particular aspect of this embodiment, the pad printed mark has a film thickness of at least 0.5 µm, or a film thickness of 5 µm or less, or a film thickness within a range having a lower limit and an upper limit selected from 0.5 µm, 1 µm, 3 µm, 4 µm, and 5 µm.

The surface on which one or more radar detectable marks are disposed can be any surface of any layer of a golf ball having any number of layers. While the invention is not meant to be limited to the placement of one or more marks on the surface of a particular layer, golf balls of the present invention are designed to allow for the optional placement of radar detectable marks on a surface other than the outer surface of the ball because it is beneficial to some golfers to be able to obtain reliable launch condition data using a golf ball that looks the same on the outside as a conventional golf ball. Thus, in a particular embodiment, one or more radar detectable marks are disposed on any surface of any layer of the golf ball other than the outermost surface.

In another particular embodiment, the golf ball is a solid, one-piece golf ball, and one or more radar detectable marks are disposed on the outer surface of the ball.

In another particular embodiment, the golf ball is a two-piece golf ball consisting of an inner core layer and an outer cover layer, and one or more radar detectable marks are disposed on:
  a) the outer surface of the outer cover layer, and/or
  b) the inner surface of the outer cover layer, and/or
  c) the outer surface of the inner core layer.

In another particular embodiment, the golf ball is a three-piece golf ball consisting of an inner core layer, an outer cover layer, and an intermediate layer disposed between the inner core layer and the outer cover layer, and one or more radar detectable marks are disposed on:
  a) the outer surface of the outer cover layer, and/or
  b) the inner surface of the outer cover layer, and/or
  c) the outer surface of the inner core layer, and/or
  d) the outer surface of the intermediate layer, and/or
  e) the inner surface of the intermediate layer.

In another particular embodiment, the golf ball is a four-piece golf ball consisting of an inner core layer, a first intermediate layer, a second intermediate layer, and an outer cover layer, and one or more radar detectable marks are disposed on:
  a) the outer surface of the outer cover layer, and/or
  b) the inner surface of the outer cover layer, and/or
  c) the outer surface of the inner core layer, and/or d) the outer surface of the first intermediate layer, and/or
e) the inner surface of the first intermediate layer, and/or
f) the outer surface of the second intermediate layer, and/or
g) the inner surface of the second intermediate layer.

In another particular embodiment, the golf ball is a five- or more piece golf ball comprising an inner core layer, a first intermediate layer, a second intermediate layer, a third intermediate layer, optional additional intermediate layers, and an outer cover layer, and one or more radar detectable marks are disposed on:
a) the outer surface of the outer cover layer, and/or
b) the inner surface of the outer cover layer, and/or
c) the outer surface of the inner core layer, and/or
d) the outer surface of the first intermediate layer, and/or
e) the inner surface of the first intermediate layer, and/or
f) the outer surface of the second intermediate layer, and/or
g) the inner surface of the second intermediate layer, and/or
h) the outer surface of the third intermediate layer, and/or
i) the inner surface of the third intermediate layer, and/or
j) the inner or outer surface of an optional additional intermediate layer.

For purposes of the present disclosure, the number of pieces/layers of a golf ball does not include any optional coatings, such as paint coatings, finish coatings, adhesive coatings, etc., even if the coating covers an entire surface of a golf ball layer. Such coatings have a thickness that is substantially less than conventional golf ball layer thicknesses, and are generally not considered by those of ordinary skill in the art to be "golf ball layers" when reference is made to a one-piece/one-layer golf ball, two-piece/two-layer golf ball, three-piece/three-layer golf ball, and so on, despite sometimes being referred to as an adhesive layer, a paint layer, a top coat layer, etc. Thus, a two-piece golf ball consisting of an inner core layer and an outer cover layer, for example, may additionally include one or more coatings.

Also, for purposes of the present disclosure, a mark is considered to be disposed on the surface of a layer regardless of whether a coating has previously been applied to the surface. In other words, if an adhesive coating is applied to a surface of a layer, and a mark is then applied on top of the adhesive coating, the mark is considered to be disposed on the surface of the layer, even though an adhesive coating is present therebetween. Likewise, if a coating is present between two layers of the ball, the layers are still considered to be adjacent to each other, even though a coating may be present therebetween.

In a particular embodiment, golf balls of the invention include an adhesive coating applied to a layer on which at least one radar detectable mark is disposed, before and/or after application of the mark(s) onto the layer. In a particular aspect of this embodiment, at least one mark is disposed on a surface of a golf ball layer and an adhesive coating is applied to the layer and on top of the mark(s). In another particular aspect of this embodiment, an adhesive coating is applied to a surface of a golf ball layer and at least one mark is disposed on the layer on top of the adhesive coating. In another particular aspect of this embodiment, a first adhesive coating is applied to a surface of a golf ball layer, at least one mark is disposed on the layer on top of the adhesive coating, and a second adhesive coating is applied to the layer and on top of the mark(s).

Each radar detectable mark has a shape selected from a variety of suitable shapes, including regular shapes and irregular shapes. Suitable examples of regular shapes include, but are not limited to, circles, rings, crescents, squares, triangles, rectangles, chevrons, and other regular polygons, irregular polygons, and basic nonpolygonal shapes. Suitable examples of irregular shapes include, but are not limited to, intersecting shapes, including, but not limited to, a series of intersecting stripes, wherein the length and width of each stripe within the series of intersecting stripes may be different than or substantially the same as that of the other stripe(s) within the series. For purposes of the present disclosure, stripes have substantially the same length and/or width if their respective lengths and/or widths differ by no more than 10%.

In a particular embodiment, the golf ball includes at least one radar detectable mark having an irregular shape defined by a series of intersecting rectangular stripes. In a particular aspect of this embodiment, the mark having an irregular shape additionally has one or more of the following properties:
a) the series of intersecting stripes consists of three rectangular stripes, or the series of intersecting stripes consists of four rectangular stripes, or the series of intersecting stripes comprises at least five rectangular stripes;
b) the series of intersecting stripes includes a first stripe and a second stripe, and the first and second stripes are substantially equal in length;
   (i) a plane bisecting the first stripe and a plane bisecting the second stripe are separated by an angle of 60° or 85° or 95° or 120° or an angle within a range having a lower limit and an upper limit selected from these values;
   (ii) the first and second stripes are substantially equal in width; and
   (iii) the first and second stripes have a length of 1.8 or 2.6 or 3.0 inches or a length within a range having a lower limit and an upper limit selected from these values; and
   (iv) the series of intersecting stripes additionally includes a third stripe and a fourth stripe, and a plane bisecting the third stripe and a plane bisecting the fourth stripe are separated by an angle of 60° or 85° or 95° or 120° or an angle within a range having a lower limit and an upper limit selected from these values;
c) each of the stripes within the series of intersecting stripes has a width of 0.20 inches or less, or a width of 0.03 inches or greater, or a width of from 0.03 inches to 0.20 inches, and, optionally, all of the stripes within the series have substantially the same width;
d) the series of intersecting stripes includes a first stripe, a second stripe, and a third stripe, each of the first and second stripes having a length of 1.8 or 2.6 or 3.0 inches or a length within a range having a lower limit and an upper limit selected from these values, and the third stripe having a length of from 0.12 inches to 0.50 inches; and
e) the series of intersecting stripes includes a first stripe, a second stripe, a third stripe, and a fourth stripe, the fourth stripe having a length that is less than that of the first and second stripes and greater than that of the third stripe.

Figure 12A:
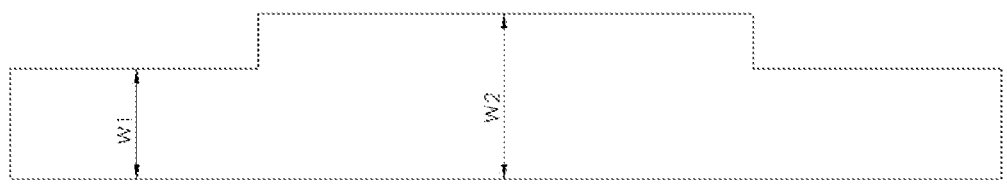
FIGS. 12A and 12B are schematic diagrams illustrating a method for determining the average width of an irregular shape according to an embodiment of the present invention.
Figure 12B:
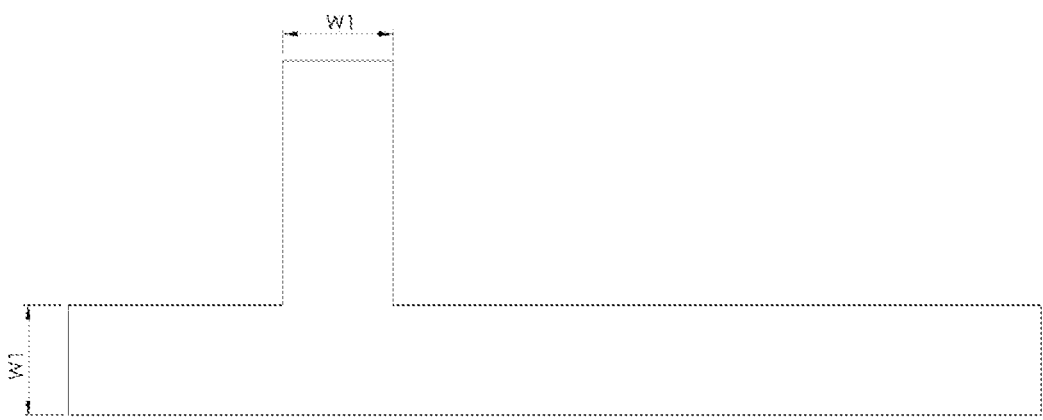

In another particular aspect of this embodiment, the golf ball includes at least one additional radar detectable mark, each of the additional radar detectable mark(s) having a shape independently selected from irregular shapes and basic, regular shapes. Suitable examples of basic, regular shapes include, but are not limited to, circles, rings, crescents, squares, triangles, rectangles, chevrons, and other regular polygons, irregular polygons, and basic nonpolygonal shapes. In a further particular aspect of this particular embodiment, the shape of at least one of the additional radar detectable mark(s) is a rectangular stripe, optionally having a length of from 0.15 inches to 0.75 inches, and optionally having a width that is substantially the same as the average width of the radar detectable mark having an irregular shape defined by a series of intersecting rectangular stripes. For purposes of the present disclosure, the average width of a mark having an irregular shape defined by a series of intersecting rectangular stripes is determined as follows. The average width is the average width across all portions of the mark. As would be readily understood by one of ordinary skill in the art, to the extent that the shape deviates from its typical shape, the "width" of that portion is determined relative to appropriate aspect ratio. For example, in FIG. 12A, the mark is wider at the middle 50% of the mark, so half of the mark has a width of W1 and half of the mark has a width of W2, so the average width is calculated as (W1+W2)/2. However, in FIG. 12B, the mark has a design such that a different dimension is used for measuring width, and since both distinct portions of the mark have a width of W1, the average width is also W1.

In embodiments of the present invention wherein the golf ball includes more than one radar detectable mark on a single layer, the shape and/or size of one mark may be the same as or different from the shape and/or size of another mark. In embodiments of the present invention wherein the golf ball includes at least two layers having one or more radar detectable marks disposed on a surface thereof, the shape and/or size of a mark on one layer may be the same as or different from the shape and/or size of a mark on another layer. In a particular embodiment, the golf ball includes at least one radar detectable mark that has a non-circular shape disposed on a surface of a layer thereof. In a particular aspect of this embodiment, the non-circular shape is an irregular shape.

Non-limiting examples of particularly suitable shapes for a single radar detectable mark or a plurality of radar detectable marks are illustrated in FIGS. 1-11.

FIG. 1 shows a mark consisting of a stripe, according to an embodiment of the present invention.

Figure 2:
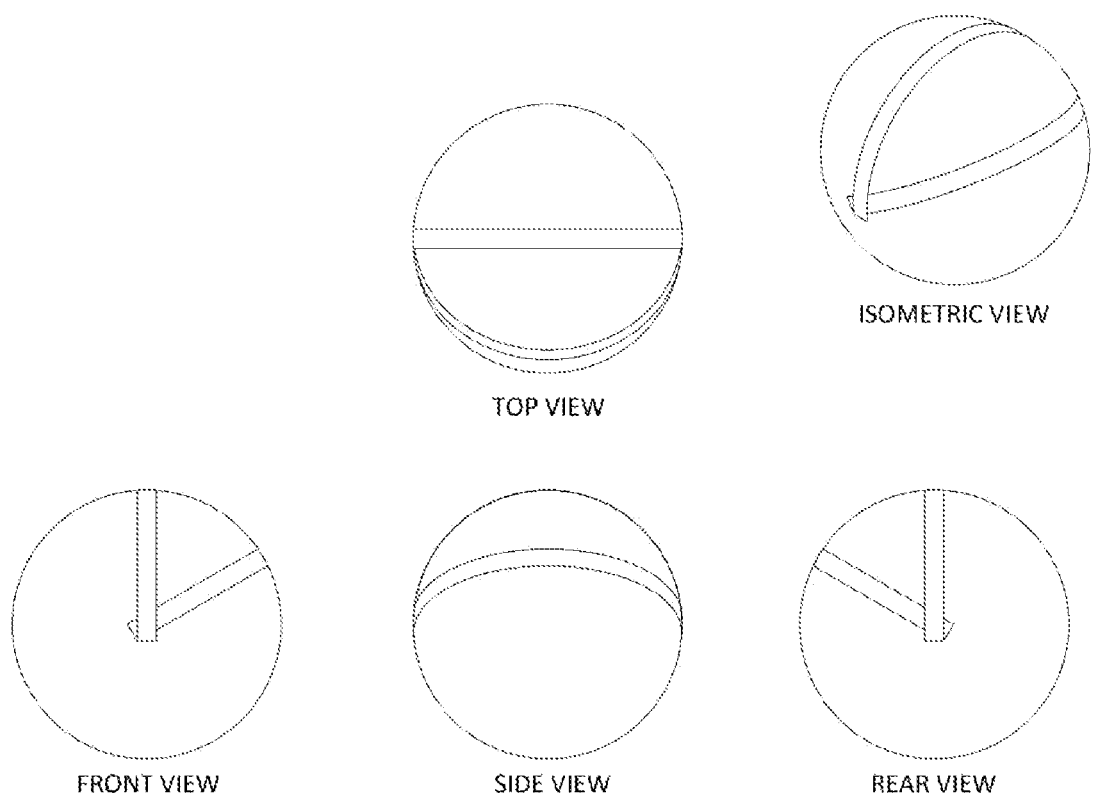
FIG. 2 illustrates a top view, an isometric view, a front view, a side view, and a rear view of a mark, according to an embodiment of the present invention.

FIG. 2 shows a mark consisting of two stripes intersecting at two locations, according to an embodiment of the present invention.

Figure 3:
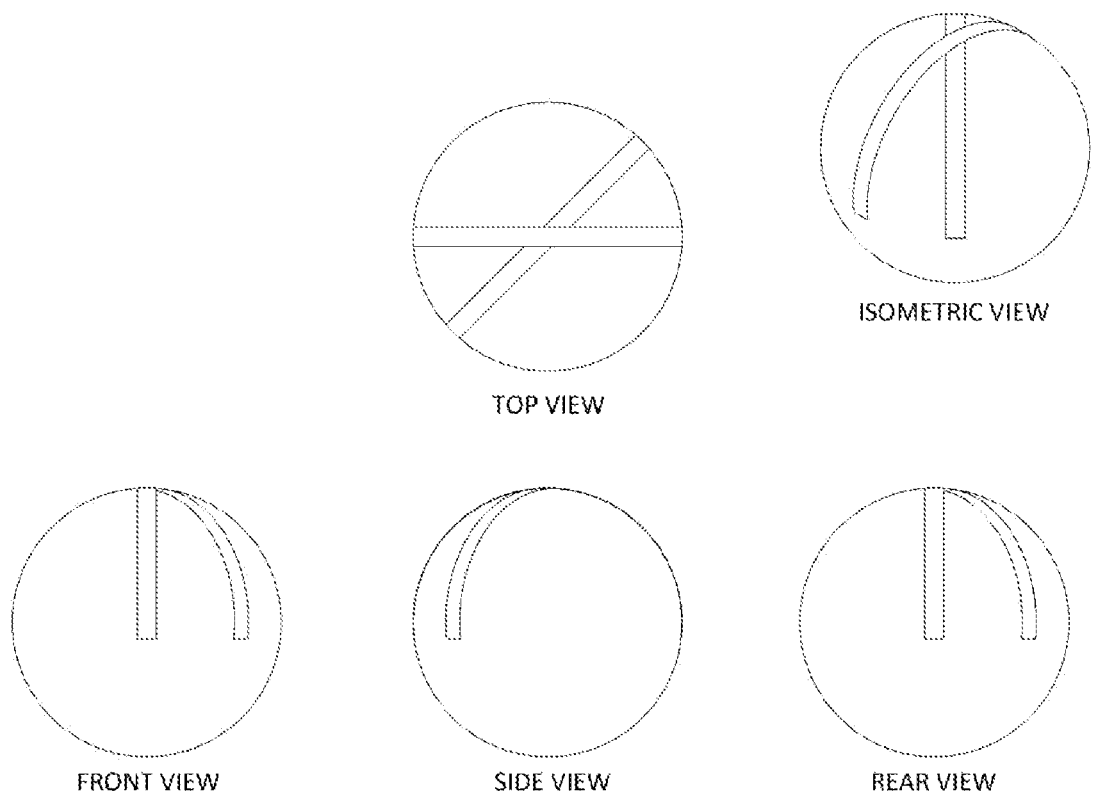
FIG. 3 illustrates a top view, an isometric view, a front view, a side view, and a rear view of a mark, according to an embodiment of the present invention.

FIG. 3 shows a mark consisting of two stripes intersecting at one location, according to an embodiment of the present invention.

Figure 4:
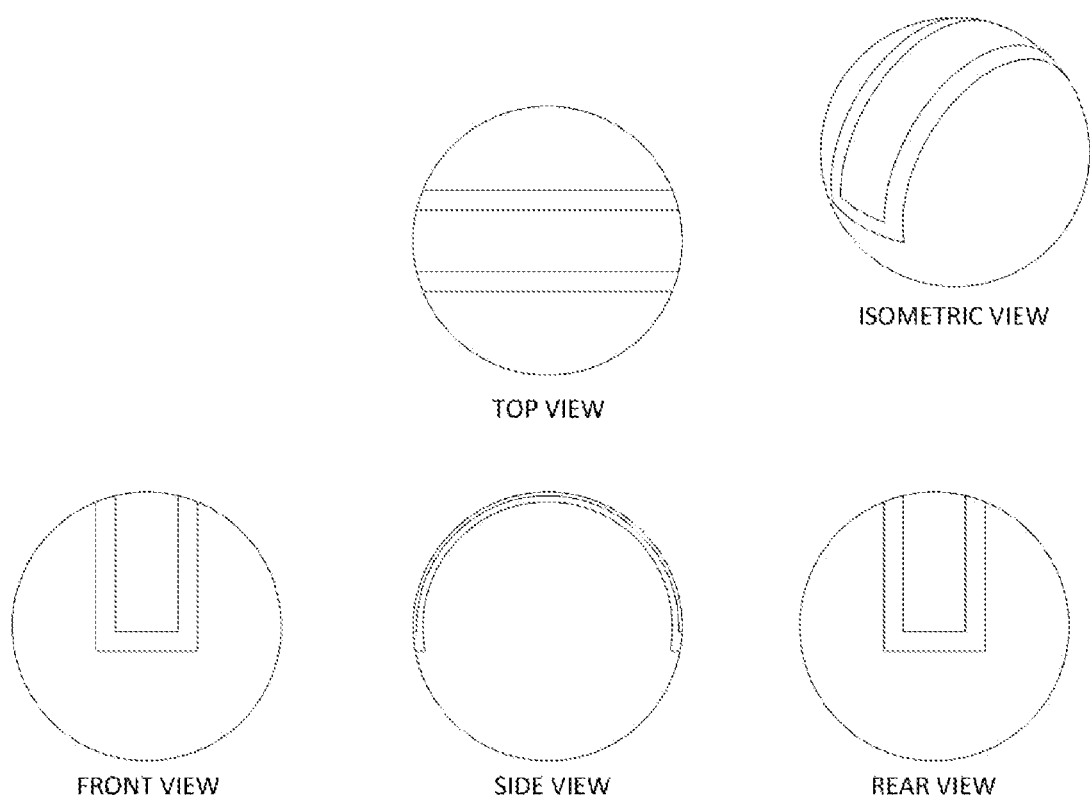
FIG. 4 illustrates a top view, an isometric view, a front view, a side view, and a rear view of a mark, according to an embodiment of the present invention.

FIG. 4 shows a mark consisting of four stripes forming a closed loop in the form of a spherical rectangle, according to an embodiment of the present invention.

Figure 5:
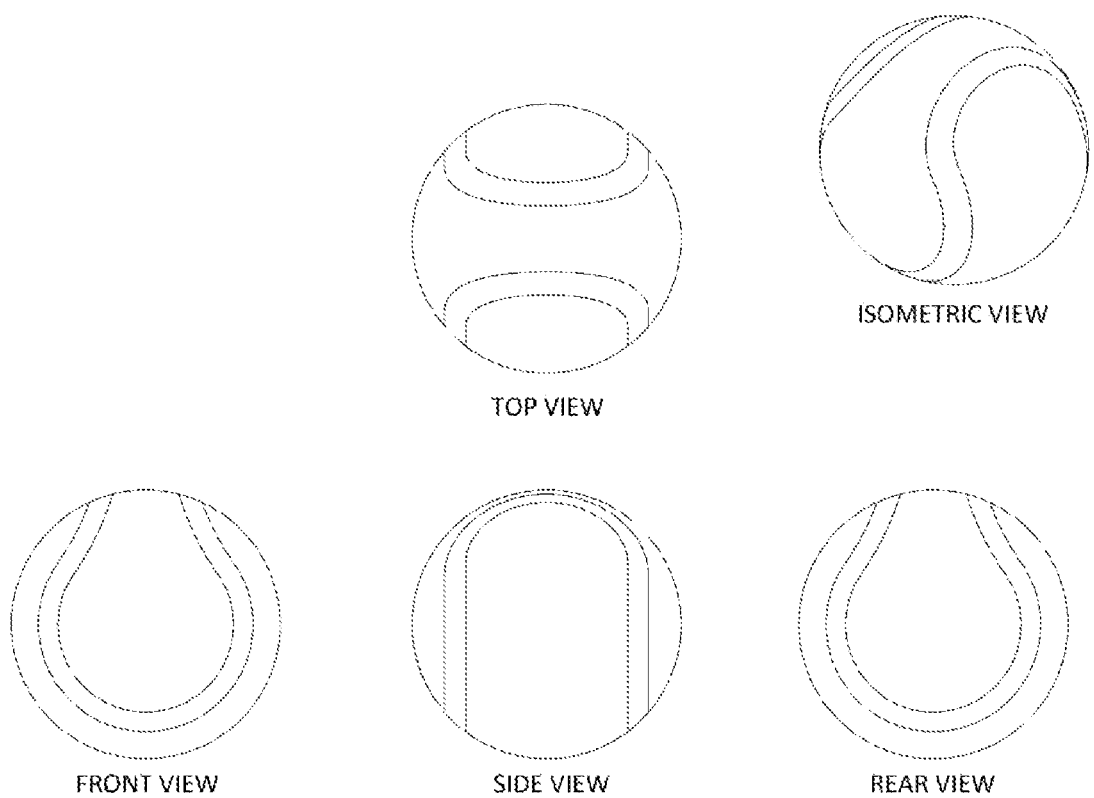
FIG. 5 illustrates a top view, an isometric view, a front view, a side view, and a rear view of a mark, according to an embodiment of the present invention.

FIG. 5 shows a mark consisting of a single curvilinear stripe creating a closed loop, according to an embodiment of the present invention.

Figure 6:
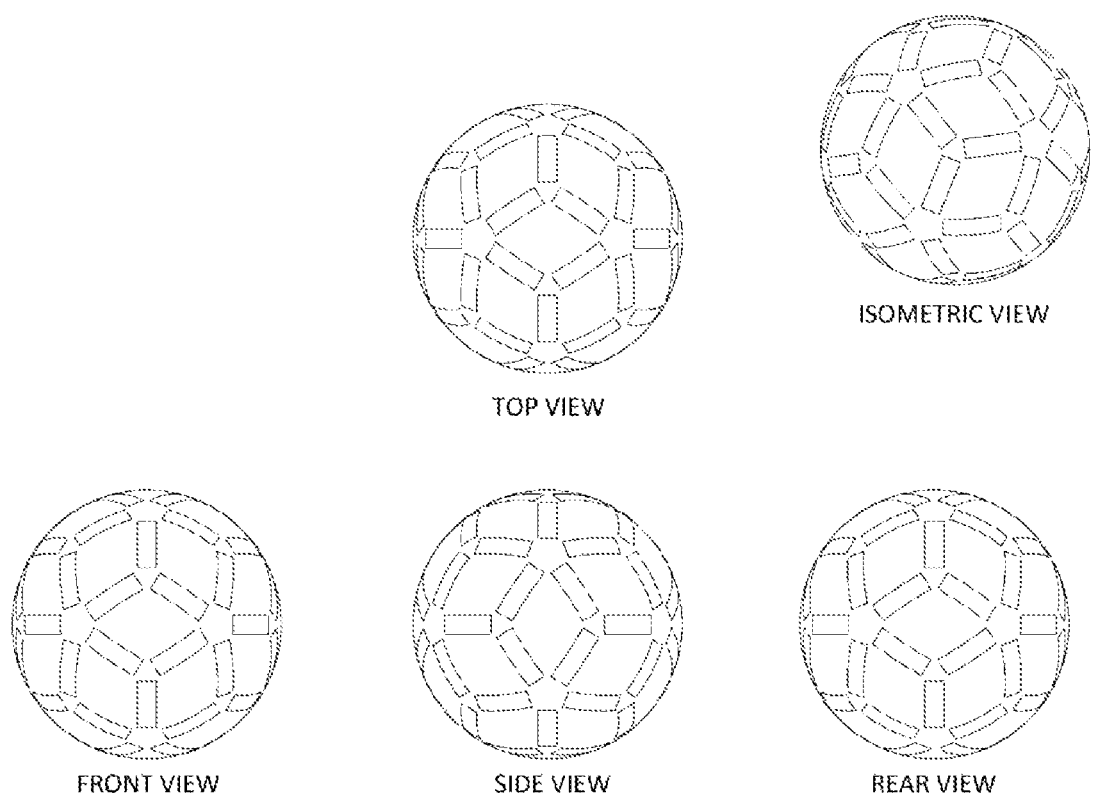
FIG. 6 illustrates a top view, an isometric view, a front view, a side view, and a rear view of a mark, according to an embodiment of the present invention.

FIG. 6 shows a plurality of marks consisting of stripes arranged in an icosahedral pattern, according to an embodiment of the present invention, the stripes having substantially the same length and width. Alternatively, the stripes are arranged in an icosahedral pattern and adjoined to form a continuous mark, according to an embodiment of the present invention.

Figure 7:
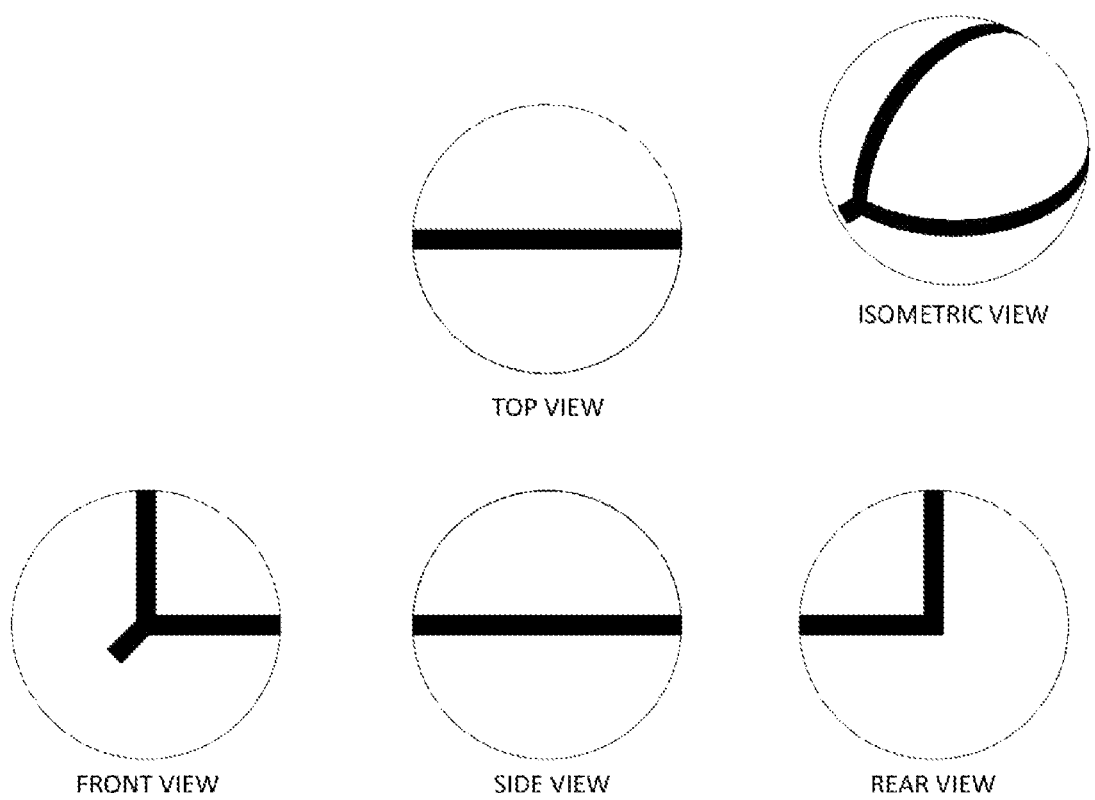
FIG. 7 illustrates a top view, an isometric view, a front view, a side view, and a rear view of a mark, according to an embodiment of the present invention.

FIG. 7 shows a mark consisting of three intersecting stripes, according to an embodiment of the present invention.

Figure 8:
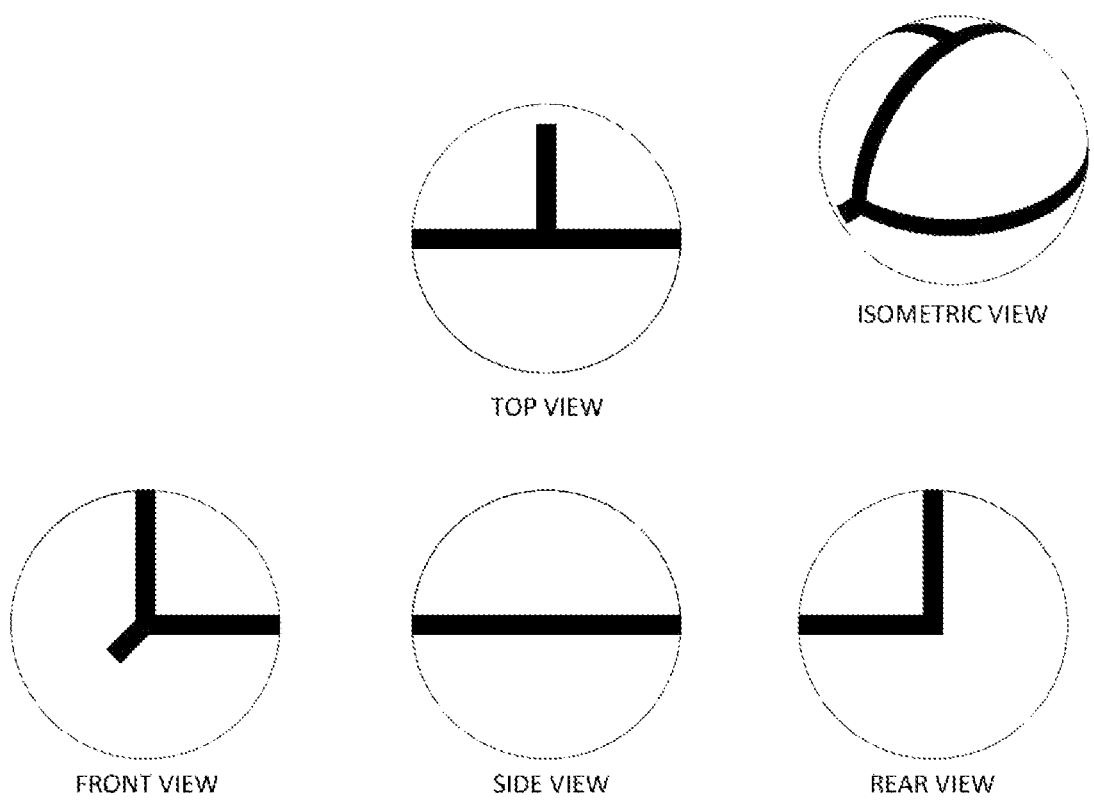
FIG. 8 illustrates a top view, an isometric view, a front view, a side view, and a rear view of a mark, according to an embodiment of the present invention.

FIG. 8 shows a mark consisting of four intersecting stripes, according to an embodiment of the present invention.

Figure 9:
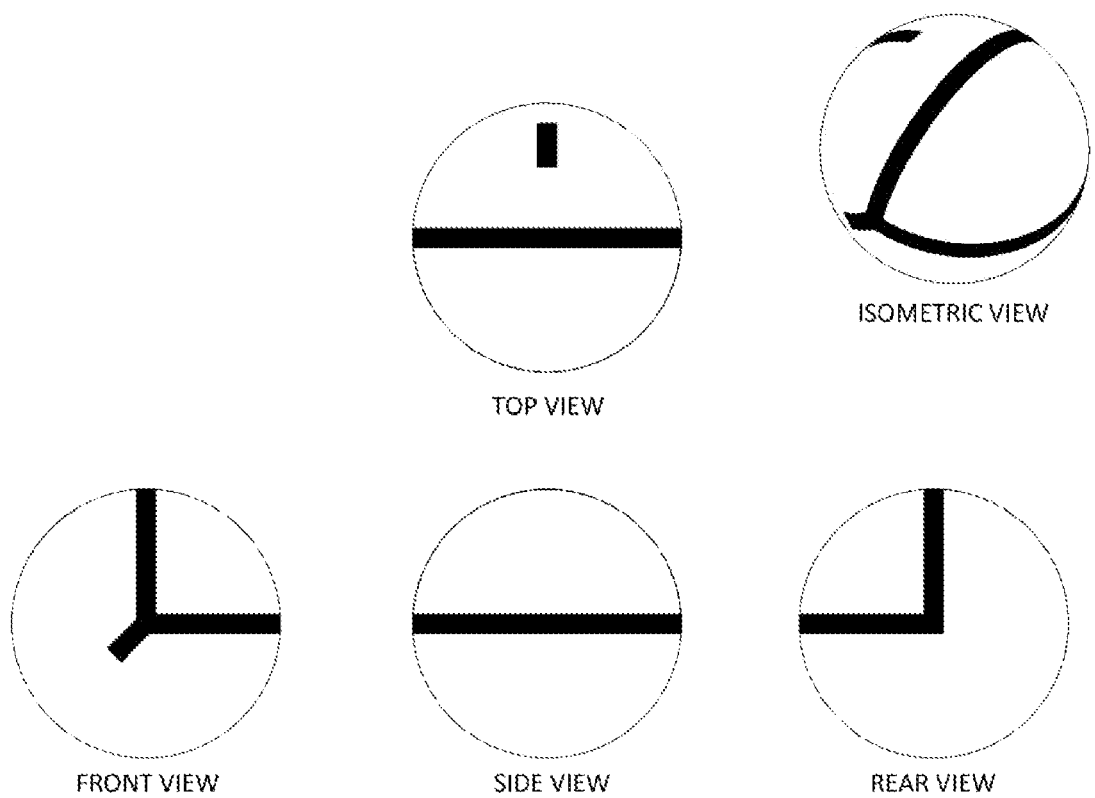
FIG. 9 illustrates a top view, an isometric view, a front view, a side view, and a rear view of a mark, according to an embodiment of the present invention.

FIG. 9 shows two marks, including a first mark consisting of three intersecting stripes and a second mark consisting of a single stripe, according to an embodiment of the present invention.

Figure 10:
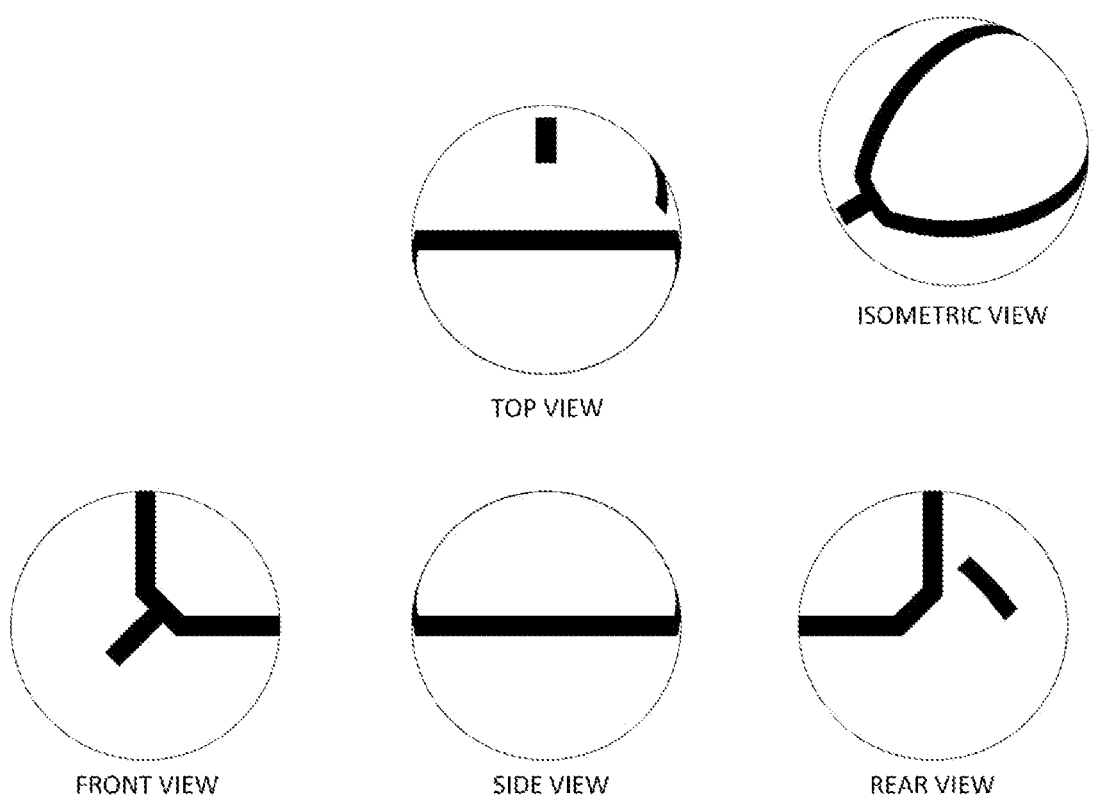
FIG. 10 illustrates a top view, an isometric view, a front view, a side view, and a rear view of a mark, according to an embodiment of the present invention.

FIG. 10 shows three marks, including a first mark consisting of five intersecting stripes, a second mark consisting of a single stripe, and a third mark consisting of a single stripe, according to an embodiment of the present invention.

Figure 11:
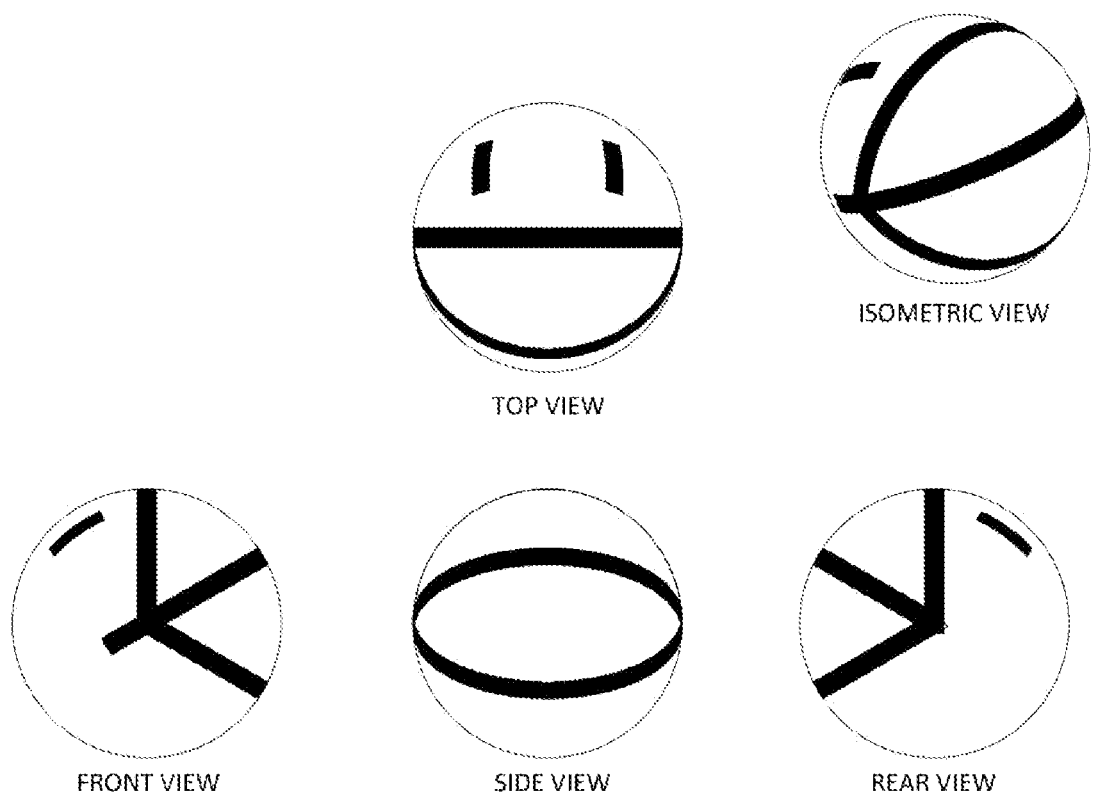
FIG. 11 illustrates a top view, an isometric view, a front view, a side view, and a rear view of a mark, according to an embodiment of the present invention.

FIG. 11 shows three marks, including a first mark consisting of four intersecting stripes, a second mark consisting of a single stripe, and a third mark consisting of a single stripe, according to an embodiment of the present invention.

In a particular embodiment, a surface of at least one layer of the golf ball includes a radar detectable mark disposed thereon and the mark is designed to have dimensions (i.e., size and shape) such that every mathematically possible 0.025 inch wide great circle path, or every mathematically possible 0.015 inch wide great circle path, or every mathematically possible 0.005 inch wide great circle path, or every mathematically possible great circle, on the golf ball layer surface on which the mark is disposed intersects the mark. For purposes of the present disclosure, a great circle path intersects a mark if any portion of the great circle path is in contact with any portion of the mark.

In another particular embodiment, a surface of at least one layer of the golf ball includes a plurality of radar detectable marks disposed thereon and the marks are designed to be sized, shaped, and positioned such that every mathematically possible 0.025 inch wide great circle path, or every mathematically possible 0.015 inch wide great circle path, or every mathematically possible 0.005 inch wide great circle path, or every mathematically possible great circle, on the golf ball layer surface on which the marks are disposed intersects at least one of the marks.

In another particular embodiment, the golf ball comprises two or more layers, wherein at least two of the two or more layers have one or more radar detectable marks disposed on a surface thereof and the marks are designed to be size, shaped, and positioned such that, when all of the radar detectable marks present on any layer of the ball are radially projected onto the outer surface of the ball, every mathematically possible 0.025 inch wide great circle path, or every mathematically possible 0.015 inch wide great circle path, or every mathematically possible 0.005 inch wide great circle path, or every mathematically possible great circle, on the golf ball outer surface intersects at least one of the marks.

In another particular embodiment, the radar detectable mark(s) have a total surface coverage of 1% or 2% or 8% or 9% or 10% or 12% or 20% or a total surface coverage within a range having a lower limit and an upper limit selected from these values. For purposes of the present disclosure, the total surface coverage of the mark(s) is calculated as the sum of the surface area of each radar detectable mark present on any layer, as measured with all of the marks present on the surface of any layer of the golf ball radially projected onto the outer surface of the ball, divided by the total surface area of the outer surface of the ball.

The present invention is not meant to be limited by the material used to form each layer of the golf ball. Particularly suitable materials include, but are not limited to, thermosetting materials, such as polybutadiene, styrene butadiene, isoprene, polyisoprene, and trans-isoprene; thermoplastics, such as ionomer resins, polyamides and polyesters; and thermoplastic and thermosetting polyurethane and polyureas.

Particularly suitable thermosetting materials, include, but are not limited to, thermosetting rubber compositions comprising a base polymer, an initiator agent, a coagent and/or a curing agent, and optionally one or more of a metal oxide, metal fatty acid or fatty acid, antioxidant, soft and fast agent, fillers, and additives. Suitable base polymers include natural and synthetic rubbers including, but not limited to, polybutadiene, polyisoprene, ethylene propylene rubber ("EPR"), styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polyalkenamers, and combinations of two or more thereof. Suitable initiator agents include organic peroxides, high energy radiation sources capable of generating free radicals, C—C initiators, and combinations thereof. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof. Suitable types and amounts of base polymer, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Particularly suitable materials also include, but are not limited to:
 a) thermosetting polyurethanes, polyureas, and hybrids of polyurethane and polyurea;
 b) thermoplastic polyurethanes, polyureas, and hybrids of polyurethane and polyurea, including, for example, Estane® TPU, commercially available from The Lubrizol Corporation;
 c) E/X- and E/X/Y-type ionomers, wherein E is an olefin (e.g., ethylene), X is a carboxylic acid (e.g., acrylic, methacrylic, crotonic, maleic, fumaric, or itaconic acid), and Y is a softening comonomer (e.g., vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons), such as Surlyn® ionomer resins and HPF 1000 and HPF 2000, commercially available from The Dow Chemical Company, Iotek® ionomers, commercially available from ExxonMobil Chemical Company, Amplify® IO ionomers of ethylene acrylic acid copolymers, commercially available from The Dow Chemical Company, and Clarix® ionomer resins, commercially available from A. Schulman Inc.;
 d) polyisoprene;
 e) polyoctenamer, such as Vestenamer® polyoctenamer, commercially available from Evonik Industries;
 f) polyethylene, including, for example, low density polyethylene, linear low density polyethylene, and high density polyethylene; polypropylene;
 g) rubber-toughened olefin polymers; non-ionomeric acid copolymers, e.g., (meth)acrylic acid, which do not become part of an ionomeric copolymer;
 h) plastomers;
 i) flexomers;
 j) styrene/butadiene/styrene block copolymers;
 k) styrene/ethylene-butylene/styrene block copolymers;
 l) polybutadiene;
 m) styrene butadiene rubber;
 n) ethylene propylene rubber;
 o) ethylene propylene diene rubber;
 p) dynamically vulcanized elastomers;
 q) ethylene vinyl acetates;
 r) ethylene (meth) acrylates;
 s) polyvinyl chloride resins;
 t) polyamides, amide-ester elastomers, and copolymers of ionomer and polyamide, including, for example, Pebax® thermoplastic polyether and polyester amides, commercially available from Arkema Inc;
 u) crosslinked trans-polyisoprene;
 v) polyester-based thermoplastic elastomers, such as Hytrel® polyester elastomers, commercially available from E. I. du Pont de Nemours and Company, and Riteflex® polyester elastomers, commercially available from Ticona;
 w) polyurethane-based thermoplastic elastomers, such as Elastollan® polyurethanes, commercially available from BASF;
 x) synthetic or natural vulcanized rubber;
 y) and combinations thereof.

Compositions comprising an ionomer or a blend of two or more E/X- and E/X/Y-type ionomers are particularly suitable intermediate and cover layer materials. Preferred E/X- and E/X/Y-type ionomeric cover compositions include:
 (a) a composition comprising a "high acid ionomer" (i.e., having an acid content of greater than 16 wt %), such as Surlyn® 8150;
 (b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn® 8150 and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;
 (c) a composition comprising a 50/45/5 blend of Surlyn® 8940/Surlyn® 9650/Nucrel® 960, preferably having a material hardness of from 80 to 85 Shore C;
 (d) a composition comprising a 50/25/25 blend of Surlyn® 8940/Surlyn® 9650/Surlyn® 9910, preferably having a material hardness of about 90 Shore C;

(e) a composition comprising a 50/50 blend of Surlyn® 8940/Surlyn® 9650, preferably having a material hardness of about 86 Shore C;

(f) a composition comprising a blend of Surlyn® 7940/Surlyn® 8940, optionally including a melt flow modifier;

(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9120), optionally including one or more melt flow modifiers such as an ionomer, ethylene-acid copolymer or ester terpolymer; and (h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8140 or 8150, 40-50 wt % Surlyn® 9120, and 0-10 wt % Surlyn® 6320).

Surlyn 8150®, Surlyn® 8940, and Surlyn® 8140 are different grades of E/MAA copolymer in which the acid groups have been partially neutralized with sodium ions. Surlyn® 9650, Surlyn® 9910, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from The Dow Chemical Company.

Suitable E/X- and E/X/Y-type ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable polyurethanes, polyureas, and blends and hybrids of polyurethane/polyurea are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; U.S. Patent Application No. 60/401,047; U.S. patent application Ser. No. 16/590,317, filed Oct. 1, 2019; U.S. Patent Application Publication No. 2007/0117923; and U.S. Pat. Nos. 8,865,052, 6,734,273, and 8,034,873; the entire disclosures of which are hereby incorporated herein by reference.

Suitable UV absorbers that are optionally included in cover layer compositions are further disclosed, for example, in U.S. Pat. No. 5,156,405 to Kitaoh; U.S. Pat. No. 5,840,788 to Lutz; and U.S. Pat. No. 7,722,483 to Morgan; the entire disclosures of which are hereby incorporated herein by reference.

Dimensions of each golf ball layer, i.e., thickness/diameter, may vary depending on the desired properties.

The United States Golf Association specifications limit the minimum size of a competition golf ball to 1.680 inches. There is no specification as to the maximum diameter, and golf balls of any size can be used for recreational play. Golf balls of the present invention can have an overall diameter of any size, and, typically, have an overall diameter of from 1.680 inches to 1.780 inches.

Golf balls of the present invention have a plurality of dimples on the outer surface thereof, and, typically, have an overall dimple surface coverage of 60% or greater, or 65% or greater, or 75% or greater or 80% or greater.

EXAMPLES

It should be understood that the examples below are merely illustrative of particular embodiments of the present invention, and are not to be construed as limiting the invention, the scope of which is defined by the appended claims.

In each of examples 1-11 below, a golf ball subassembly having a diameter of about 1.630 inches and consisting of a solid rubber core and an ionomer casing layer was provided. A mark, or a plurality of marks, as indicated below, was pad printed on the outer surface of each subassembly using electrically conductive ink to produce a marked subassembly.

Example 1

In this example, the mark consists of a single stripe, according to the embodiment illustrated in FIG. 1. The stripe has a width of about 0.120 inches and a length of about 2.750 inches. Every mathematically possible 0.025 inch wide great circle path on the spherical outer surface of the casing intersects the mark.

Example 2

In this example, the mark consists of two stripes intersecting at two locations, according to the embodiment illustrated in FIG. 2. The stripes are substantially equal in size, each stripe having a width of about 0.120 inches and a length of about 2.750 inches. Every mathematically possible 0.025 inch wide great circle path on the spherical outer surface of the casing intersects the mark.

Example 3

In this example, the mark consists of two stripes intersecting at one location, according to the embodiment illustrated in FIG. 3. The stripes are substantially equal in size, each stripe having a width of about 0.120 inches and a length of about 2.750 inches. Every mathematically possible 0.025 inch wide great circle path on the spherical outer surface of the casing intersects the mark.

Example 4

In this example, the mark consists of four stripes forming a closed loop in the form of a spherical rectangle, according to the embodiment illustrated in FIG. 4. The stripes are substantially equal in width, each stripe having a width of about 0.120 inches. Each of the two stripes forming the long sides of the spherical rectangle has a length of about 2.670 inches, and each of the two stripes forming the short sides of the spherical rectangle has a length of about 0.380 inches. Every mathematically possible 0.025 inch wide great circle path on the spherical outer surface of the casing intersects the mark.

Example 5

In this example, the mark consists of a single curvilinear stripe creating a closed loop, according to the embodiment illustrated in FIG. 5. The stripe has a width of about 0.120 inches. The closed loop has a length of about 8.390 inches. Every mathematically possible 0.025 inch wide great circle path on the spherical outer surface of the casing intersects the mark.

Example 6

In this example, the plurality of marks consists of sixty stripes arranged in an icosahedral pattern, according to the embodiment illustrated in FIG. 6. The stripes are substantially equal in size, each stripe having a width of about 0.120 inches and a length of about 0.350 inches. Every mathematically possible 0.025 inch wide great circle path on the spherical outer surface of the casing intersects the mark.

Example 7

In this example, the mark consists of three intersecting stripes according to the embodiment illustrated in FIG. 7. The first stripe and the second stripe have substantially the same length, each of the first stripe and the second stripe having a length of about 2.60 inches. The third stripe has a length of about 0.25 inches. The first stripe, the second stripe, and the third stripe have substantially the same width, each stripe having a width of about 0.12 inches. The mark has an average width of about 0.12 inches. A plane bisecting the first stripe and a plane bisecting the second stripe are separated by an angle of about 90°, as illustrated in the front view and the rear view of FIG. 7. The mark has a total surface coverage of about 8%.

Example 8

In this example, the mark consists of four intersecting stripes, according to the embodiment illustrated in FIG. 8. The first stripe and the second stripe have substantially the same length, each of the first stripe and the second stripe having a length of about 2.60 inches. The third stripe has a length of about 0.25 inches. The fourth stripe has a length of about 0.75 inches. The first stripe, the second stripe, the third stripe, and the fourth stripe have substantially the same width, each stripe having a width of about 0.12 inches. The mark has an average width of about 0.12 inches. A plane bisecting the first stripe and a plane bisecting the second stripe are separated by an angle of about 90°, as illustrated in the front view and the rear view of FIG. 8. The mark has a total surface coverage of about 9%

Example 9

In this example, the plurality of marks consists of a first mark and a second mark, according to the embodiment illustrated in FIG. 9.

The first mark consists of three intersecting stripes, including a first stripe, a second stripe, and a third stripe. The first stripe and the second stripe of the first mark have substantially the same length, each of the first stripe and the second stripe having a length of about 2.60 inches. The third stripe of the first mark has a length of about 0.25 inches. The first stripe, the second stripe, and the third stripe of the first mark have substantially the same width, each stripe of the first mark having a width of about 0.12 inches. The first mark has an average width of about 0.12 inches. A plane bisecting the first stripe and a plane bisecting the second stripe are separated by an angle of about 90°, as illustrated in the front view and the rear view of FIG. 9.

The second mark consists of a single stripe having a length of about 0.40 inches and a width of about 0.12 inches.

The plurality of marks has a total surface coverage of about 8%.

Example 10

In this example, the plurality of marks consists of a first mark, a second mark, and a third mark, according to the embodiment illustrated in FIG. 10.

The first mark consists of five intersecting stripes, including a first stripe, a second stripe, a third stripe, a fourth stripe, and a fifth stripe. The first stripe and the second stripe of the first mark have substantially the same length, each of the first stripe and the second stripe having a length of about 2.15 inches. The third stripe and the fourth stripe of the first mark connect the ends of the first and second stripes. The third stripe and the fourth stripe of the first mark have substantially the same length, each of the third stripe and the fourth stripe having a length of about 0.30 inches. The fifth stripe of the first mark has a length of about 0.40 inches. The first stripe, the second stripe, the third stripe, the fourth stripe, and the fifth stripe of the first mark have substantially the same width, each stripe of the first mark having a width of about 0.12 inches. The first mark has an average width of about 0.12 inches. A plane bisecting the first stripe and a plane bisecting the second stripe are separated by an angle of about 90°, as illustrated in the front view and the rear view of FIG. 10.

The second mark consists of a single stripe having a length of about 0.40 inches and a width of about 0.12 inches.

The third mark consists of a single stripe having a length of about 0.40 inches and a width of about 0.12 inches.

The plurality of marks has a total surface coverage of about 9%

Example 11

In this example, the plurality of marks consists of a first mark, a second mark, and a third mark, according to the embodiment illustrated in FIG. 11.

The first mark consists of four intersecting stripes, including a first stripe, a second stripe, a third stripe, and a fourth stripe. The first stripe, the second stripe, and the third stripe of the first mark have substantially the same length, each of the first stripe, the second stripe, and the third stripe having a length of about 2.50 inches. The fourth stripe of the first mark has a length of about 0.25 inches. The first stripe, the second stripe, the third stripe, and the fourth stripe of the first mark have substantially the same width, each stripe of the first mark having a width of about 0.12 inches. The first mark has an average width of about 0.12 inches. A plane bisecting the first stripe and a plane bisecting the second stripe are separated by an angle of about 60°, as illustrated in the front view and the rear view of FIG. 11. A plane bisecting the second stripe and a plane bisecting the third stripe are separated by an angle of about 60°, as illustrated in the front view and the rear view of FIG. 11.

The second mark consists of a single stripe having a length of about 0.40 inches and a width of about 0.12 inches.

The third mark consists of a single stripe having a length of about 0.40 inches and a width of about 0.12 inches.

The plurality of marks has a total surface coverage of about 12%.

In each of examples 1-11 above, a finished golf ball was formed by molding a cover layer about the marked subassembly. The finished golf balls were repeatedly fired via air cannon to a mass plate, simulating golf ball driver impact speed greater than 175 miles per hour. Subsequent to repeated testing, the balls were tested using a mechanical robot swinging a driver. The average launch condition for the balls was 175 mph, 9.5 degrees, 2600 rpm, as measured using a photogrammetric system. The radar tracking system was able to accurately measure spin at a capture rate of greater than 96% utilizing 16 feet of ball flight. The radar tracking system used for testing was a TrackMan golf radar, commercially available from TrackMan Golf, with the TrackMan set to indoor mode.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a layer with a mark disposed on a surface thereof, wherein the mark has a continuous non-circular shape and is formed from an electrically conductive ink, wherein the mark enables detection of spin of the golf ball via a radar tracking system that is configured for use in an indoor golf ball hitting bay, the electrically conductive ink comprising:
    a base resin selected from the group consisting of vinyl polymers, urethane polymers, acrylic polymers, epoxy polymers, and combinations of two or more thereof; and
    an electrically conductive material selected from the group consisting of silver, conductive carbon, aluminum, graphene, nanotubes, nanometals, and combinations of two or more thereof,
    wherein the mark has a resistivity of 0.1 Ohms to 2,500 Ohms, and a film thickness of 0.5 µm-5.0 µm;
    wherein the golf ball comprises an inner core layer, an outer cover layer, and one or more intermediate layers disposed between the inner core layer and the outer cover layer; and the surface on which the mark is disposed is an outer surface of the intermediate layer positioned adjacent to the outer cover layer.

2. The golf ball of claim 1, wherein the mark is opaque.
3. The golf ball of claim 1, wherein the mark is transparent.
4. The golf ball of claim 1, wherein the mark has dimensions such that every 0.025 inch wide great circle path on the golf ball layer surface on which the mark is disposed intersects the mark.
5. The golf ball of claim 1, wherein the mark has a width of 0.03 inches-0.20 inches.
6. The golf ball of claim 1, wherein the outer surface of the intermediate layer on which the mark is applied consists of a uniform, spherical profile.
7. A golf ball comprising a layer with a mark disposed on a surface thereof, wherein the mark is radar reflective and enables detection of spin of the golf ball via a radar tracking system that is configured for use in an indoor golf ball hitting bay, wherein:
    the mark has a continuous shape and is formed from a radar detectable material comprised of an electrically conductive ink, the electrically conductive ink comprising:
    a base resin selected from the group consisting of vinyl polymers, urethane polymers, acrylic polymers, epoxy polymers, and combinations of two or more thereof; and
    an electrically conductive material selected from the group consisting of silver, conductive carbon, aluminum, graphene, nanotubes, nanometals, and combinations of two or more thereof; and
    the mark has dimensions such that every 0.025 inch wide great circle path on the golf ball layer surface on which the mark is disposed intersects the mark; and
    the mark has a film thickness of 0.5 µm-5.0 µm.
8. The golf ball of claim 7, wherein every 0.015 inch wide great circle path on the golf ball layer surface on which the mark is disposed intersects the mark.
9. The golf ball of claim 7, wherein every 0.005 inch wide great circle path on the golf ball layer surface on which the mark is disposed intersects the mark.
10. The golf ball of claim 7, wherein every great circle path on the golf ball layer surface on which the mark is disposed intersects the mark.
11. The golf ball of claim 7, wherein the mark consists of a stripe.
12. The golf ball of claim 7, wherein the mark consists of two stripes intersecting at two locations.
13. The golf ball of claim 7, wherein the mark consists of four stripes forming a closed loop.
14. The golf ball of claim 13, wherein the closed loop forms a spherical rectangle.
15. The golf ball of claim 7, wherein the mark consists of a single curvilinear stripe creating a closed loop.

* * * * *